April 24, 1951     J. E. REDFORD     2,550,380
PROGRESSIVE RELEASE JETTISON TANK
Filed April 16, 1947     2 Sheets-Sheet 1
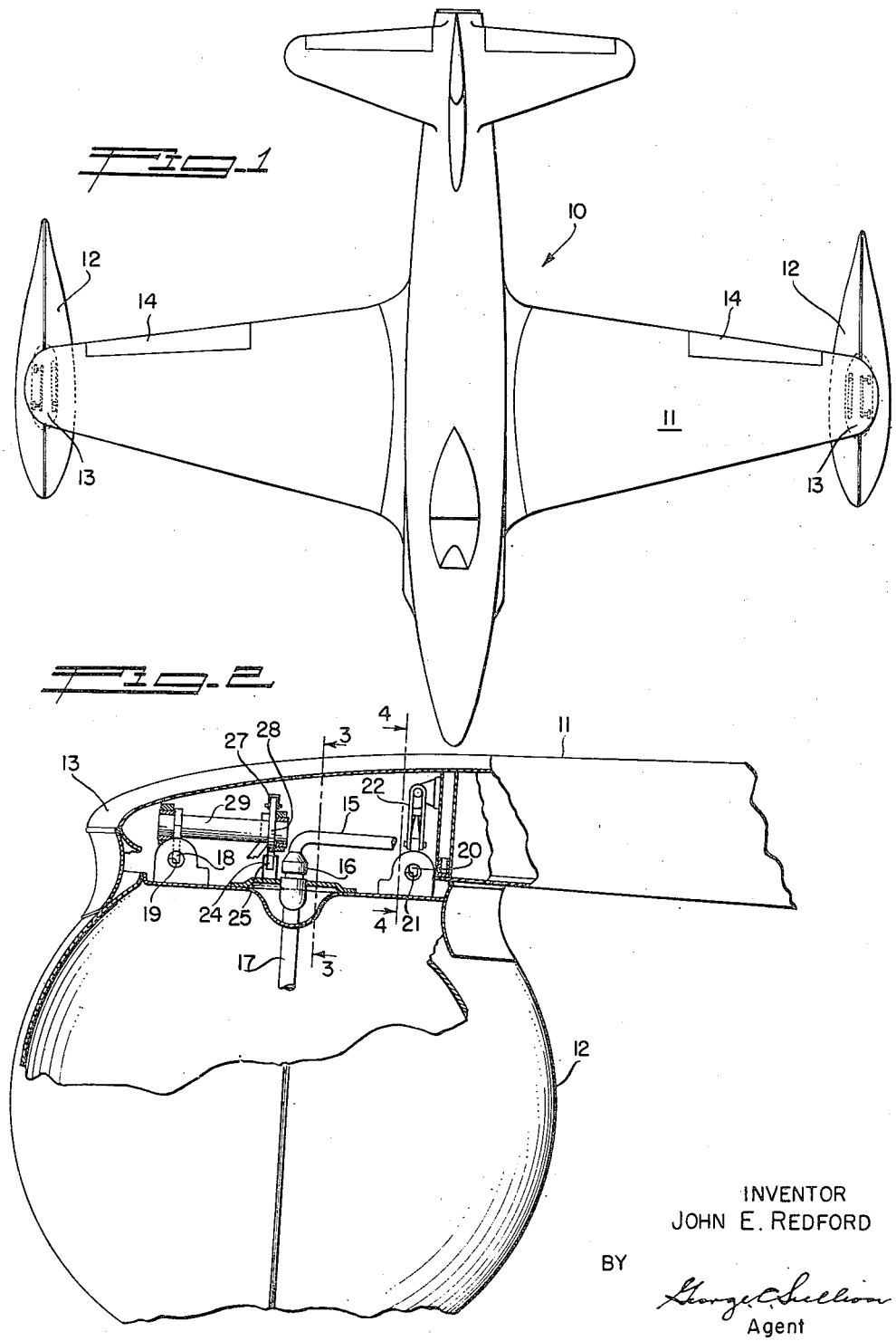
INVENTOR
JOHN E. REDFORD
BY
George C. Sullivan
Agent April 24, 1951   J. E. REDFORD   2,550,380
PROGRESSIVE RELEASE JETTISON TANK
Filed April 16, 1947   2 Sheets-Sheet 2
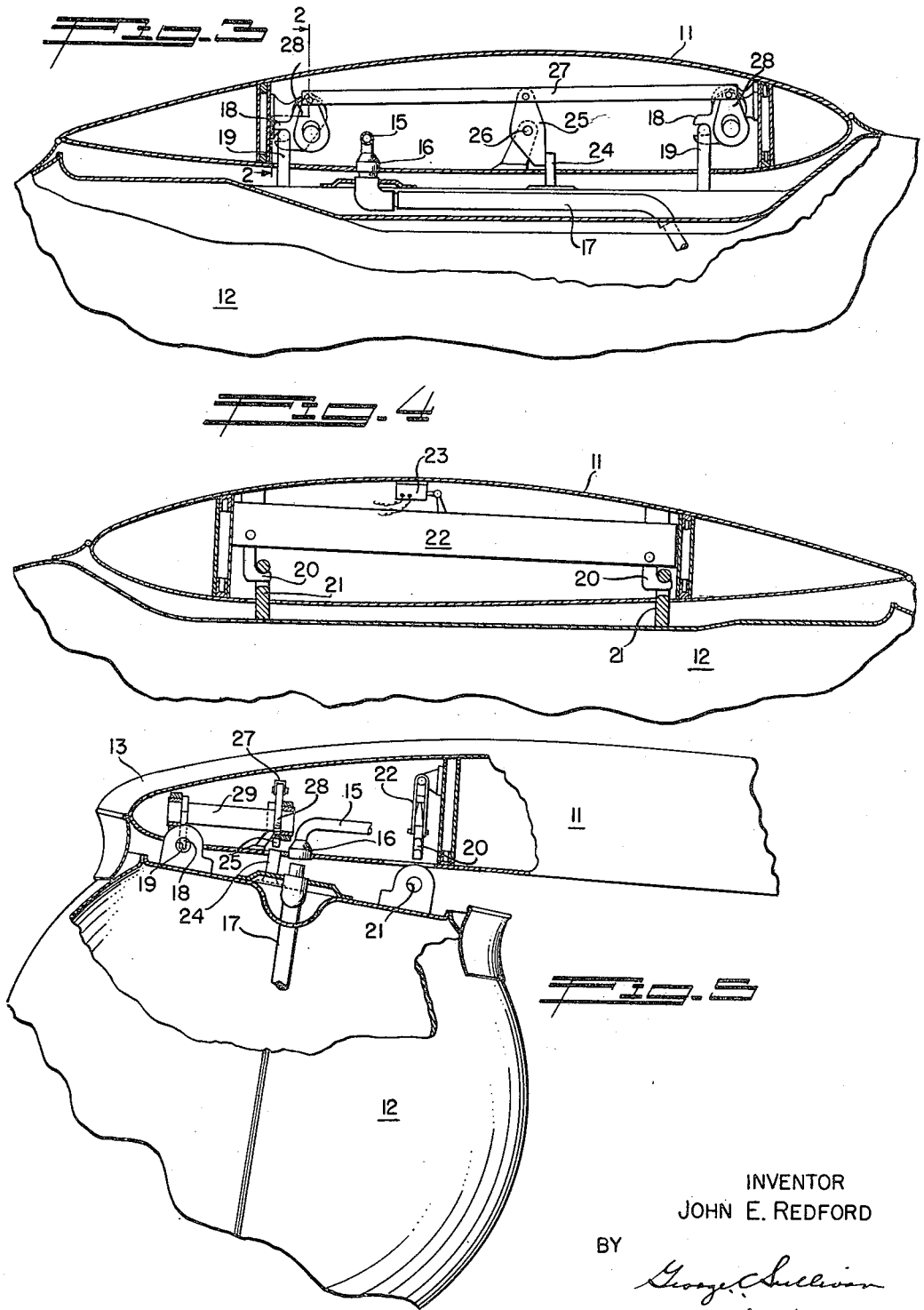
INVENTOR
JOHN E. REDFORD
BY
George C. Sullivan
Agent Patented Apr. 24, 1951

2,550,380

UNITED STATES PATENT OFFICE 2,550,380

PROGRESSIVE RELEASE JETTISON TANK

John E. Redford, Glendale, Calif., assignor to Lockheed Aircraft Corporation, Burbank, California Application April 16, 1947, Serial No. 741,809

4 Claims. (Cl. 244—135)

This invention relates to the progressive release of jettisonable equipment such as auxiliary fuel tanks, suspended from the wings of airplanes, and releasable therefrom in flight when empty or in the event of emergency.

Jettisonable fuel tanks have been used for some time because of the added range provided thereby and the fact that the use of such auxiliary tanks suspended from the wings outboard of the landing gear actually reduce the aerodynamic stresses imposed on the wing structure as compared to installing an equivalent weight within the fuselage of the airplane. In practice, however, the release of such tanks in flight has resulted in various accidents which have forced the imposition of restrictions as to airplane speed and altitude at the moment of release. For example, if the tank is released at high speed, especially when empty, the aerodynamic forces acting on the streamlined tank at the moment of release may cause its nose to swing up and hit the wing and/or aileron, or the empennage surfaces of the airplane. Such restrictions on the release of the tanks has also prevented the use of increased sizes and capacities which aggravate these difficulties and increase the damage to the airplane in the event of accidental contact.

It is, accordingly, an object of this invention to provide means to facilitate the release or jettisoning of tanks or external compartments suspended from the wing or other airplane structure and to control their initial movement prior to complete detachment and free flight relative to the airplane. The principal object of this invention is to impose a rotational force on the object about an axis parallel to the line of flight in order to produce a spin or rotational inertia therein to oppose aerodynamic forces thereon having a tendency to cause the object to nose up or tumble end over end at the moment of release.

It is also an object of this invention to provide improved means for releasably supporting jettisonable equipment from aircraft structures wherein the weight of the equipment is normally supported or distributed over a plurality of points, and release of the equipment is arranged progressively as regards such points of support whereby to impose a desired directional movement of the equipment prior to complete release thereof.

Other objects and features of this invention will be readily understood from the following detailed description of a typical preferred form of the invention wherein reference will be made to the accompanying drawings.

This invention is shown in a preferred form in connection with jettisonable fuel tanks attached adjacent the wing tips of an airplane.

In the drawings:

Figure 1 is a plan view of an airplane equipped with fuel tanks mounted in the manner of this invention;

Figure 2 is an enlarged section on the line 2—2 of Figure 3 showing the progressive release mechanism attaching the tank to the wing;

Figure 3 is a section on the line 3—3 of Figure 2 showing the delayed release mechanism;

Figure 4 is a section on the line 4—4 of Figure 2 showing the initial release mechanism; and Figure 5 is a section similar to Figure 2 wherein the tank is shown as pivoted into the position at which the delayed release mechanism is automatically tripped.

As shown in the drawings:

An airplane 10, with wings 11, is provided with jettisonable fuel tanks 12 carried suspended beneath the tips 13 of the wings, outboard of the ailerons 14. Fuel is withdrawn from the tanks 12 by means of a conduit 15 leading to the engine fuel system (not shown) which conduit has a slip joint or quick disconnect 16 to a delivery pipe 17 extending down into the tank 12. While it is desirable to use one of the self-sealing quick disconnect fittings commercially available, a simple rubber sleeve will serve the present purpose, as it can be arranged to slip off the pipe 17 when the tank is released.

Jettisonable fuel tanks have heretofore been suspended by a conventional shackle, analagous to a bomb shackle, disposed axially of the tank. In my invention, two parallel lines of support are provided, spaced on either side of a vertical plane through the tank axis, thus eliminating the need of sway braces for the tank. Each line of support comprises two hooks spaced on a fore and aft line, the outboard pair of hooks 18 in Figure 2 engaging eyes 19 on the tank and being arranged for initial pivotal movement of the tank upon the release of an inboard pair of hooks 20 engaging eyes 21 on the tank.

The hooks 20 are shown in Figure 4 as part of conventional bomb shackle 22 which can be released by the pilot as by an electrical solenoid 23. When so released the tank swings down about the hooks 18 as pivots, pulling the fuel slip joint 16 free and withdrawing a lug 24 from locking engagement with a cam 25 (see Figure 3). The cam is pivoted at 26 and has links 27 connecting the levers 28 on shafts 29 carrying the hooks 18 previously mentioned. As the shackle 22 releases a predetermined time in advance of the disengagement of the lug 24 from the cam 25, so that the entire weight of the tank is then suspended from the hooks 18 and serves to rotate the hooks 18 and shafts 29 into disengagement with the eyes 19. The extent of rotation of the tank prior to final release of the hooks 18 can be predetermined by the spacing or position of the cam 25 and lug 24 relative to the hooks 18, as well as the initial overlap or interference between the cam and lug.

The controlled initial downward and outward movement of the tank, with its axis restrained or maintained generally parallel to that of the flight path of the airplane, imparts a rotary motion or spin to the tank that stabilizes its initial flight, preventing tumbling or end-over-end motion at the moment of final release.

It will thus be seen that I have invented an improved sequential or progressive release for jettisonable tanks and the like which eliminates the need of sway braces and imposes a predetermined initial flight path on the tank at the moment of final release by imparting a spin or rotational inertia thereto to resist aerodynamic forces acting on the tank and having a tendency to produce tumbling thereof at the instant of release.

Having thus described my invention and the present preferred embodiments thereof, I desire to emphasize the fact that many modifications may be resorted to in a manner limited only by a just interpretation of the following claims.

I claim as my invention:

1. A progressive release mechanism adapted to impart axial rotation in a streamlined jettisonable tank and the like, comprising transversely spaced separately releasable inboard and outboard supporting means for said tank, means for releasing the inboard supporting means at the will of the pilot, and means for automatically releasing the outboard supporting means after a predetermined pivotal movement of said tank about said last mentioned supporting means comprising a cam associated with said outboard supporting means and a blocking lug carried by said tank and arranged to block said cam during the predetermined pivotal movement of said tank.

2. A progressive release mechanism adapted to impart axial rotation in an elongated jettisonable tank and the like, comprising a pair of transversely spaced separately releasable supporting means for said tank, means for releasing one of said spaced supporting means at the will of the pilot, and means for automatically releasing the other of said spaced supporting means after a predetermined pivotal movement of said tank about said last mentioned supporting means comprising a detent associated with the other supporting means and a lug carried by said tank in a position to normally block said detent and to release the same after a predetermined pivotal movement of said tank.

3. A progressive release mechanism adapted to initiate rotary motion in a jettisonable tank and the like, comprising transversely spaced releasable inboard and outboard supporting means for said tank, means for releasing the inboard supporting means at the will of the pilot, and means for automatically releasing the outboard supporting means, said releasing means including latch means associated with said last mentioned supporting means, said latch means being so arranged as to be mechanically released by the tank after a predetermined pivotal movement of said tank about said last mentioned supporting means.

4. A progressive release mechanism for initiating axial rotation in jettisonable objects of circular section suspended externally from an airplane, comprising separate pairs of longitudinally aligned couplings, one pair of couplings being disposed on either side of the center of gravity of the object suspended thereby, means for releasing one pair of couplings at the will of the pilot, and means for sequentially releasing the other pair of couplings, said last mentioned means including a mechanical latch associated with said last mentioned couplings and released by a predetermined axial rotation of the object to be jettisoned.

JOHN E. REDFORD.

REFERENCES CITED

The following references are of record in the file of this patent:

UNITED STATES PATENTS

| Number | Name | Date |
|---|---|---|
| 1,322,160 | Breguet | Nov. 18, 1919 |
| 2,010,817 | Henry | Aug. 13, 1935 |
| 2,124,867 | Akerman | July 26, 1938 |
| 2,416,104 | Lerche | Feb. 18, 1947 |
| 2,421,699 | Johnson | June 3, 1947 |

FOREIGN PATENTS

| Number | Country | Date |
|---|---|---|
| 80,178 | Austria | Feb. 25, 1920 |